United States Patent [19]

Twombly

[11] Patent Number: 5,136,516
[45] Date of Patent: Aug. 4, 1992

[54] ANALOG AND DIGITAL SPEED DISPLAY DEVICE

[75] Inventor: Jeffrey G. Twombly, Rochester, N.Y.

[73] Assignee: General Signal Corporation, Stamford, Conn.

[21] Appl. No.: 458,058

[22] Filed: Dec. 28, 1989

[51] Int. Cl.⁵ .................... G06F 7/70; G06F 15/48; B61L 21/04; G09G 1/00
[52] U.S. Cl. .................... 364/426.05; 364/426.01; 246/1 C; 246/23; 246/167 R; 340/700; 340/753
[58] Field of Search .............. 364/426.05, 424.01, 364/426.01; 246/1 C, 23, 47, 63 C, 97, 101, 103, 167 R, 167 D, 187 R, 187 A, 187 B, 182 R, 182 C; 340/700, 753, 754

[56] References Cited

U.S. PATENT DOCUMENTS

| | | | |
|---|---|---|---|
| 3,726,250 | 4/1973 | Merk | 340/754 X |
| 3,794,833 | 2/1974 | Blazek et al. | 246/63 C |
| 4,279,395 | 7/1981 | Boggio et al. | 246/182 |
| 4,415,974 | 11/1983 | Laug et al. | 364/426.01 |
| 4,495,578 | 1/1985 | Sibley et al. | 364/426 |
| 4,630,043 | 12/1986 | Haubner et al. | 364/424.01 X |
| 4,713,762 | 12/1987 | Igarashi | 364/424.01 |
| 4,814,757 | 3/1989 | Patterson et al. | 340/753 |
| 4,815,824 | 3/1989 | Sharples | 340/753 X |

OTHER PUBLICATIONS

"Signals in rails given to motorman", Railway Signaling & Communications; Dec. 1967; by C. L. Wilksten.

Primary Examiner—Parshotam S. Lall
Assistant Examiner—E. J. Pipala
Attorney, Agent, or Firm—Ohlandt, John F.; Milton E. Kleinman

[57] ABSTRACT

An analog and digital display device for use with railroad vehicles which comprises: a host processor which transmits operational data received from a digital overspeed controller (DOC), such as actual speed, allowable speed, profile speed, distance to profile, messages and an indication of overspeed; a central processing unit (CPU) which receives and interprets operational data transmitted by the host processor; and an analog and digital display which displays the operational data in both analog and digital formats.

19 Claims, 3 Drawing Sheets

ANALOG AND DIGITAL SPEED DISPLAY DEVICE

The analog and digital display device of the present invention is used primarily in railroad trains to convey operational information to the train operator. The information conveyed typically includes actual speed, allowable speed (speed limit), profile speed, overspeed indicator, and many other parameters necessary for vehicle operation.

BACKGROUND OF THE INVENTION

Automatic Train Systems divide the railroad track into units called blocks. Wayside circuitry is capable of resolving vehicle location to within a block. To provide vehicle carried apparatus or a train operator with traffic information, other wayside circuitry transmits an indication of the distance between a vehicle and the immediately preceding vehicle. This information is coded so as to represent, at least, a speed limit. The speed limit is computed such that it is always possible for the following vehicle to stop within the unoccupied distance between vehicles. The actual speed is transmitted to the train operator via a speed probe connected to a speedometer.

If the actual speed exceeds the speed limit an overspeed condition is detected. When an overspeed condition is detected the governor may automatically impose a brake application; or signal the vehicle operator that he must impose a brake application. Unfortunately, the application of the brake may bring the vehicle under speed sooner than is actually required by the actual clear distance between vehicles, or the vehicle does not decelerate quickly enough.

To alleviate the problem of early braking or late deceleration, a profile speed calculated by a vehicle carried apparatus is utilized. See U.S. Pat. No. 4,495,578 (Sibley et al.), issued Jan. 22, 1985. The profile speed gradually decreases, say from a first or higher speed limit when the profile generation apparatus is initiated, to a lower or zero speed limit at the termination of the speed profile generation. That is, the profile speed is typically fed to the governor, along with the wayside generated speed limit, and safely allows the governor to control the vehicle to be at a speed below the higher of the two (speed profile or wayside generated) limits.

Conventionally available display units typically only display the actual speed of the vehicle. However, since the allowable speed (speed limit) and profile speed are extremely critical to proper vehicle operation, the present inventor found it necessary to develop a device capable of simultaneously displaying the relationship between actual, allowable, and profile speeds.

The present inventor undertook the development of a novel analog and digital display device which is capable of providing operational information, such as actual train speed, allowable train speed, profile speed, overspeed alarm, and many other parameters, simultaneously. The display format of the present invention allows for faster, more accurate interpretation of a greater number of operational parameters than conventional analog aspect displays. The design of the present invention is such that the information regarding the various speeds (i.e., actual, allowable and profile) can be displayed in both analog and digital formats.

The present invention also provides many additional advantages which shall become apparent as described below.

SUMMARY OF THE INVENTION

An analog and digital display device for use with railroad vehicles comprising: a host processor which transmits operational data received from a digital overspeed controller (DOC), such as actual speed, allowable speed, profile speed, distance to profile, messages and overspeed; a central processing unit (CPU) which receives and interprets operational data transmitted by the host processor; and a analog and digital display which displays the operational data in both analog and digital formats. The host processor interfaces with the CPU by means of a serial interface.

An additional feature of the present invention includes a speed probe which is used to transmit an actual speed signal to a CPU. The CPU then calculates actual speed from this speed signal and uses this information to drive an analog and digital display. The speed probe is used whenever the analog and digital display is used as a speedometer only or when the digital overspeed controller (DOC) is malfunctioning.

A further object of the present invention is to provide an analog and digital display which comprises: a means for providing an analog and/or digital display of the actual speed of the vehicle, as well as an overspeed indication; a means for providing an analog and/or digital display of the profile speed of the vehicle; and a means for providing an analog and/or digital display of the allowable speed of the vehicle.

The analog and digital display also includes a means for providing a digital display of the distance to profile and a means for displaying various other messages to the operator.

Other and further objects, advantages and features of the present invention will be understood by reference to the following specification in conjunction with the annexed drawings, wherein like parts have been given like numbers.

DESCRIPTION OF THE PREFERRED EMBODIMENTS

The analog and digital display device of the present invention is designed to convey operational information to the train operator. This information includes actual speed, allowable speed (speed limit), profile speed, and many other parameters. The display operates in two basic modes. First, the display device receives operational information from a digital overspeed controller (DOC). Second, the display device can directly interface with a speed probe so as to operate as a stand alone speedometer. This novel analog and digital display device provides a display format which allows for faster, more accurate interpretation of a greater number of operational parameters than conventional analog aspect displays.

Figure 1:
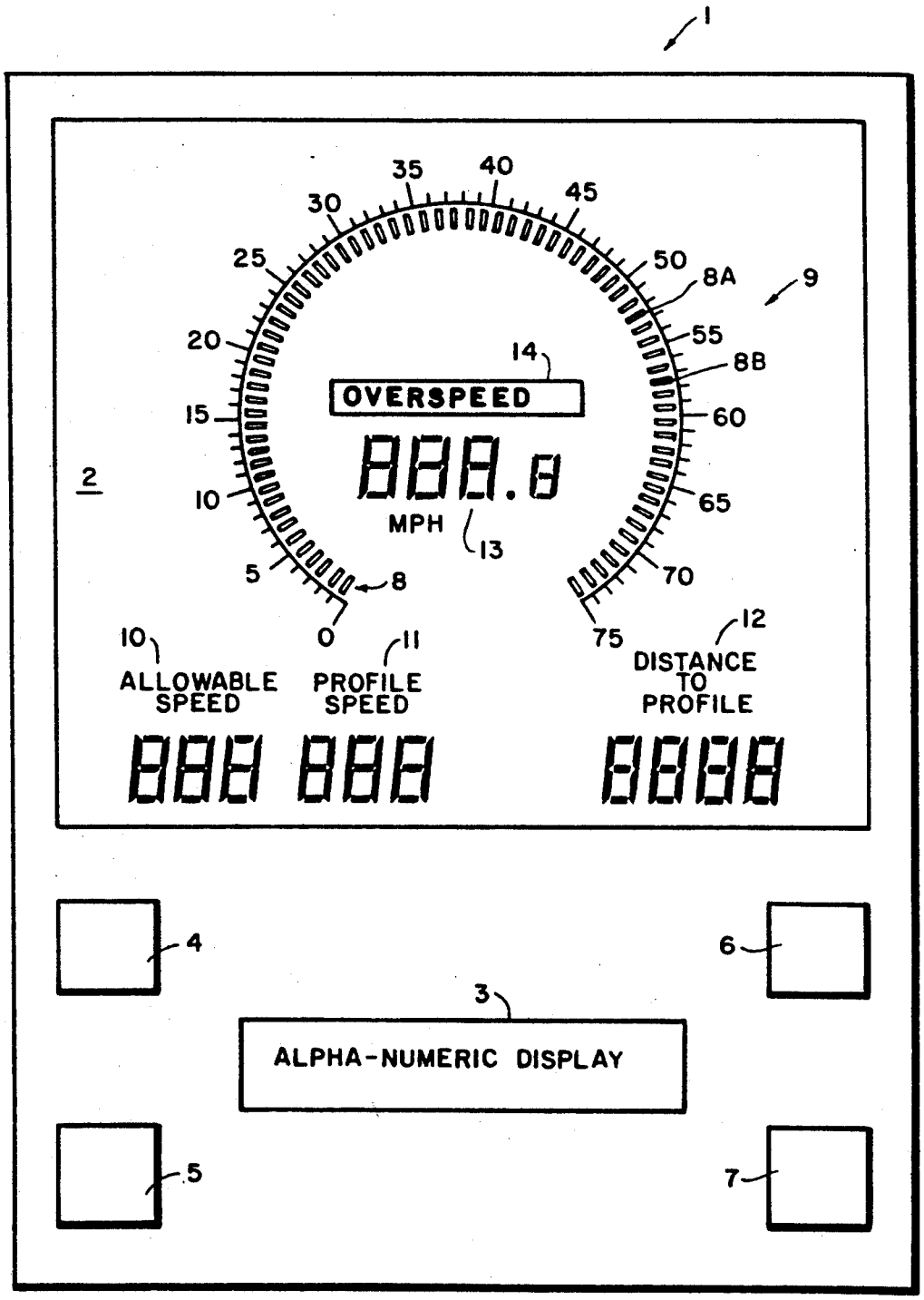
FIG. 1 is a schematic representation of the analog and digital display device according to the present invention.

The present invention can best be understood by referring to the attached drawings in which FIG. 1 depicts an analog and digital display device in accordance with the present invention.

Analog and digital display device 1 conveys information to the train operator via an analog and digital display 2, free form alpha-numeric display 3, and indicator/input switches 4, 5, 6, and 7. Analog and digital display 2 consists of a combination of approximately 200 liquid crystal display (LCD) segments and graphical artwork 9. Artwork 9 consists of a meter scale which surrounds an arc of 75 LCD segments 8. Artwork 9 can be changed to fit the needed range of a particular application without affecting display design. Numerical display titles 10, 11, 12, and 13, and overspeed indicator 14 are actually a single LCD segment each and thus can be either blanked or displayed by means of suitable programming according to need.

An audible alarm (not shown) can be synchronized to overspeed indicator 14 so that both are activated when an overspeed condition occurs.

The display format is designed to present accurate information in an easy to interpret manner. This is accomplished by presenting all speed information in both a digital numeric and simulated analog format. In FIG. 1 actual speed in analog format is implemented by a continuous bar of LCD segments 8 going from zero to the actual speed at a given time, as shown by artwork 9. The same information is shown in a more accurate digital format as single LCD segment 13 in the center of analog and digital display 2. The allowable speed is displayed in digital format by single segment 10; and in analog format on a single lit segment 8A on the bar 8 (next to meter scale 9) on the display 2. Such segment is lit steady unless the actual speed surpasses it in which case it flashes to indicate position.

The profile speed indicates the speed curve required to make a smooth transition from a less restrictive to a more restrictive speed limit zone. The profile speed can be displayed in both analog and digital formats, as provided by suitable programming, similar to the allowable speed as noted above. The digital format displays the profile speed by means of single LCD segment 11, whereas the analog format involves the lit segment 8B. However, the profile speed is typically displayed only as long as a profile speed curve is in effect.

Accordingly, it will be appreciated that all speed parameters, i.e., actual speed, allowable speed, and speed profile are displayable simultaneously in both analog and digital formats by the display device of the present invention.

FIG. 1 depicts analog and digital display device 1 having optional free form alpha-numeric display 3 which typically consists of a 20 character by 4 line LCD display. Alpha-numeric display 3 is formatted such that a host processor (not shown) can write any string to any location on display 3. Alpha-numeric display 3 is designed to indicate any number of messages to the operator. These might include system parameters, system operating conditions, error conditions, or a host of other free text messages.

Alpha-numeric display 3 and analog and digital display 2 are backlit for low level ambient light use. The backlighting method used is low power, low temperature EL panels.

Finally, analog and digital display device 1 can optionally include at least one indicator/input switch. FIG. 1 shows four indicator/input switches 4, 5, 6, and 7 which can be used as system status indicators or as system inputs depending on the application requirements.

Figure 2:
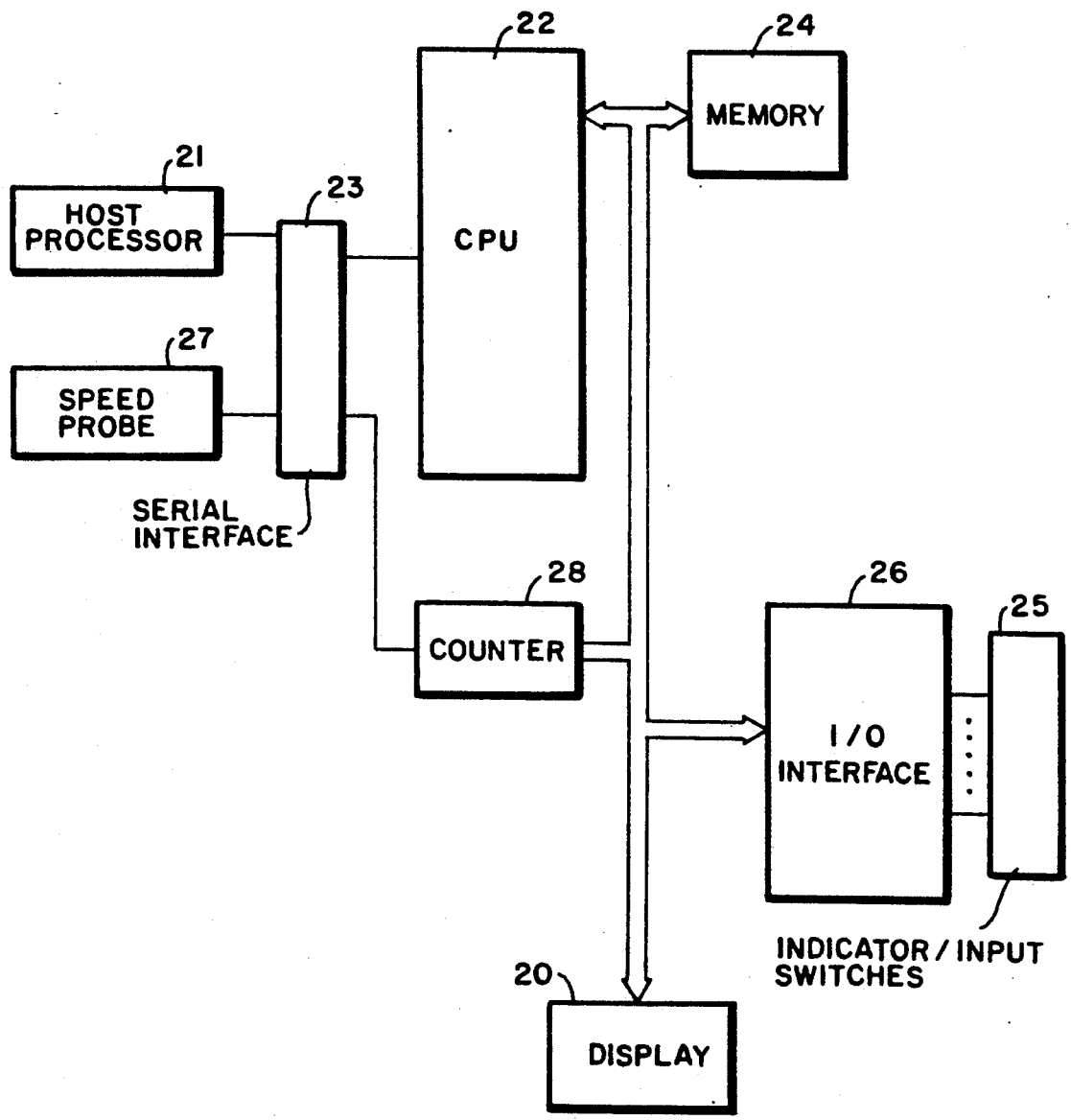
FIG. 2 is a schematic diagram of the analog and digital display system according to the present invention.

FIG. 2 is a block diagram of a typical analog and digital display system according to the present invention wherein analog and digital display 20 interfaces with a host processor 21 through CPU 22 and serial interface 23. CPU 22 is attached to a memory unit 24 which includes both ROM and RAM, wherein the ROM contains embedded source code and the RAM stores the variable data being written in, and also reads out such data.

Operational data, such as, actual speed, allowable speed, and profile speed, is sent from a digital overspeed controller (not shown) to host processor 21 which then transmits the data through serial interface 23 to CPU 22. The operational data is then transmitted from CPU 22 to display 20 where it is received, decoded and displayed on analog and digital display 20. Typically, the displayed operational data is updated every 100 milliseconds.

Host processor 21 is also capable of transmitting data to and receiving inputs from indicator/input switches 25. Indicator/input switches 25 interface with host processor 21 through input/output interface 26 and CPU 22.

When the analog and digital display device is used in a stand alone mode, an active speed probe 27 is interfaced with CPU 22 via serial interface 23 and programmable counter 28. CPU 22 thereafter transmits speed data received from speed probe 27 to display 20 which receives, decodes and displays the actual speed of the train. This mode is also the backup mode for use with the automatic train control module. That is, if digital overspeed controller module (not shown) stops sending data to host processor 21, then display 20 reverts to calculating speed from speed probe 27. This allows for uninterrupted speed indication in the event of automatic train control module failure.

The analog and digital display device also incorporates wheel wear compensation so that as the wheel diameter changes, the speedometer reading will remain true.

The analog and digital display device also incorporates a watchdog reset circuit. This circuit must be reset periodically by CPU 22 as a means of verifying normal system software flow. If the watchdog circuit is not reset within a certain time frame, CPU 22 will receive a reset signal resulting in the reinitialization of program variables and pointers so that normal program flow can be restored.

The analog and digital display device contains all necessary voltage converters required. This allows the device to operate from a single +12 V supply. This feature, along with the use of serial communications, decreases the number of interconnecting wires required as compared to conventional devices. A minimum system would require only 4 conductors between the digital overspeed controller module and display device. The display device consists of two printed circuit boards, the CPU board and the display board. The CPU board contains the CPU logic, the serial interface logic from the DOC and speed probe, alarms, and the voltage converters. The display board contains the custom LCD display, its drivers, and the wear wheel compensation switch.

Figure 3:
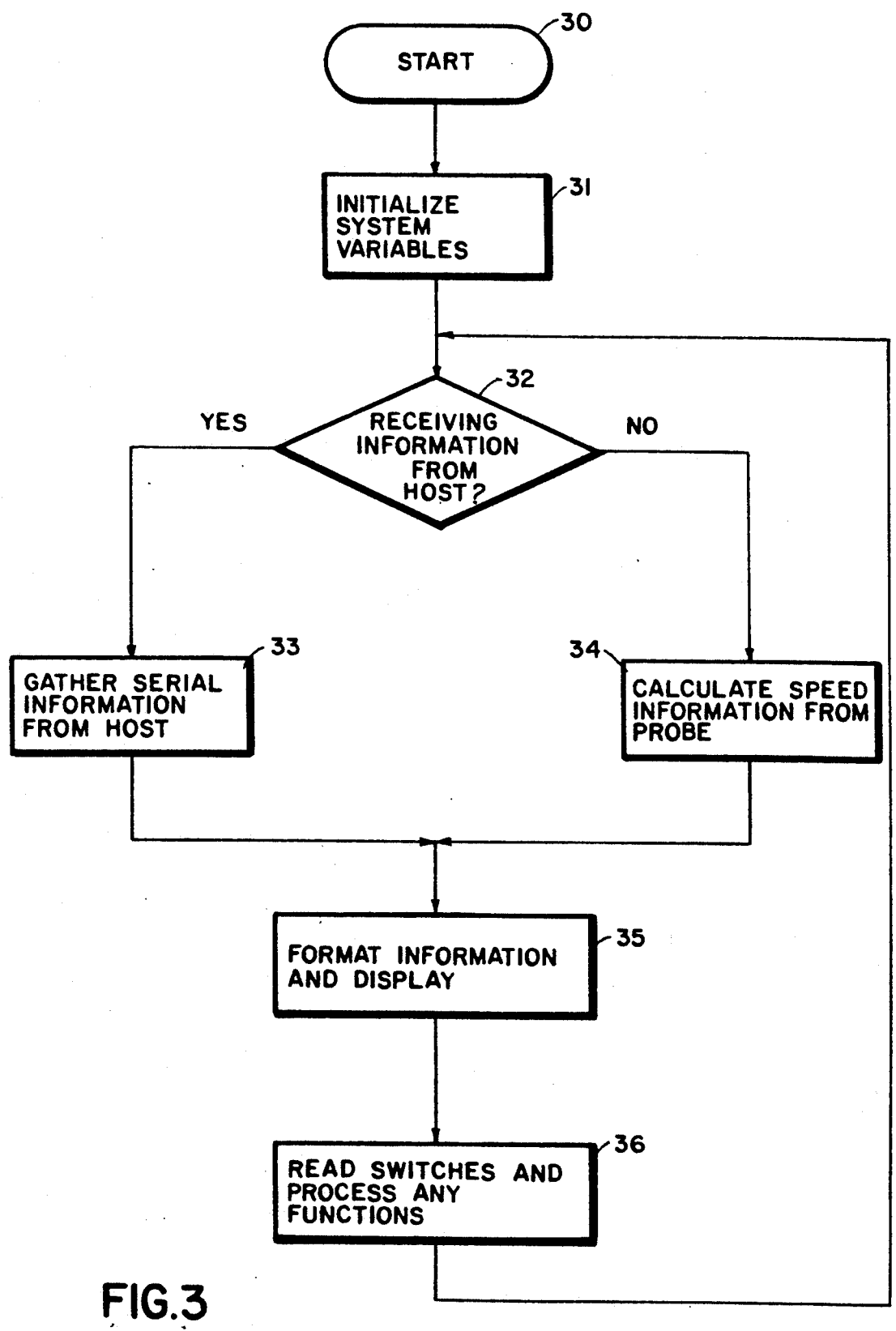
FIG. 3 is a flowchart of the operational steps of the processing involved in displaying operational information on the analog and digital display device in accordance with the present invention.

FIG. 3 depicts the various operational steps of the processing involved in the analog and digital display system of the present invention; also, FIG. 3 thereby depicts the means, shown by the functional blocks, for performing such operational steps. The system operates according to the following steps: (30) start up the system; (31) initialize system variables; (32) if system is receiving information from host processor then go to step 33, if not go to step 34; (33) gather serial information from host processor then go to step 35; (34) calculate speed information from speed probe then go to step 35; (35) format information and display; and (36) read switches, process any functions and return to step 32.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

I claim:

1. An analog and digital speed display device for use with railroad vehicles comprising:
   means for receiving externally generated operational data and transmitting said data within said analog and digital speed display device;
   means for processing said data from said receiving means; and
   means for displaying the processed data which comprises: a means for providing an analog and/or digital display of the actual speed of said vehicle; a means for providing an analog and/or digital display of the profile speed of said vehicle when a profile speed curve is in effect; and a means for providing an analog and/or digital display of the allowable speed of said vehicle.

2. The analog and digital speed display device according to claim 1, wherein said display means also includes means for providing a digital display of the distance to profile.

3. The analog and digital speed display device according to claim 1, wherein said means for providing an analog and/or digital display of the actual speed is a liquid crystal display.

4. The analog and digital speed display device according to claim 1, wherein said means for providing an analog and/or digital display of the allowable speed is a liquid crystal display.

5. The analog and digital speed display device according to claim 1, wherein said means for providing an analog and/or digital display of the profile speed is a liquid crystal display.

6. The analog and digital speed display device according to claim 2, wherein said means for providing a digital display of the distance to profile is a liquid crystal display.

7. The analog and digital speed display device according to claim 1, wherein said display means also includes a means for indicating overspeed of said vehicle.

8. The analog and digital speed display device according to claim 7, wherein said means for indicating overspeed is a liquid crystal display.

9. The analog and digital speed display device according to claim 8, wherein an audible alarm is synchronized to said means for indicating overspeed.

10. The analog and digital speed display device according to claim 1, wherein said display means also includes a means for displaying messages transmitted from said receiving means.

11. The analog and digital speed display device according to claim 10, wherein said means for displaying messages is an alpha-numeric liquid crystal display.

12. The analog and digital speed display device according to claim 1, wherein said display means also includes at least one indicator/input switch.

13. The analog and digital speed display device according to claim 1, wherein the analog display of said actual, allowable, and profile speeds is in the form of a continuous bar of liquid crystal display segments shaped in an arc.

14. The analog and digital speed display device according to claim 1, wherein said receiving means is a host processor.

15. The analog and digital speed display device according to claim 14, wherein said data processing means is a central processing unit.

16. The analog and digital speed display device according to claim 15, wherein said host processor interfaces with said central processing unit by means of a serial interface.

17. The analog and digital speed display device according to claim 15, wherein said central processing unit is electrically connected to a memory unit.

18. The analog and digital speed display device according to claim 1, wherein said data processing means receives actual speed data from an external speed probe via a programmable counter, whereby said display means operates as a speedometer.

19. The analog and digital speed display device according to claim 18, wherein said external speed probe is placed in operation either when said display means is to function solely as a speedometer or when said receiving means is not receiving said operational data.

* * * * *